US009993958B2

(12) United States Patent
Chauvin et al.

(10) Patent No.: US 9,993,958 B2
(45) Date of Patent: Jun. 12, 2018

(54) METHOD AND APPARATUS FOR THE FABRICATION OF A CONTAINER, SUCH AS A BEVERAGE CONTAINER

(71) Applicant: DISCMA AG, Hünenberg (CH)

(72) Inventors: Guillaume Chauvin, Monthureux sur Saone (FR); Klaus Hartwig, Nancy (FR); Damien Kannengiesser, Golbey (FR)

(73) Assignee: DISCMA AG, Zürich (CH)

( * ) Notice: Subject to any disclaimer, the term of this patent is extended or adjusted under 35 U.S.C. 154(b) by 498 days.

(21) Appl. No.: 14/410,493

(22) PCT Filed: Jun. 14, 2013

(86) PCT No.: PCT/EP2013/062331
§ 371 (c)(1),
(2) Date: Dec. 22, 2014

(87) PCT Pub. No.: WO2014/001099
PCT Pub. Date: Jan. 3, 2014

(65) Prior Publication Data
US 2015/0343695 A1 Dec. 3, 2015

(30) Foreign Application Priority Data

Jun. 27, 2012 (EP) .................................. 12173754

(51) Int. Cl.
B29C 49/12 (2006.01)
B29C 49/00 (2006.01)
(Continued)

(52) U.S. Cl.
CPC .......... B29C 49/0042 (2013.01); B29C 49/06 (2013.01); B29C 49/12 (2013.01);
(Continued)

(58) Field of Classification Search
None
See application file for complete search history.

(56) References Cited

U.S. PATENT DOCUMENTS 4,573,596 A * 3/1986 Slat .................. B29C 49/24
215/12.2
4,863,046 A * 9/1989 Collette .............. B29C 49/0073
215/381

(Continued)

FOREIGN PATENT DOCUMENTS

EP 0322651 A2 7/1989

OTHER PUBLICATIONS

International Search Report for PCT/EP2013/062331 (in English), dated Oct. 21, 2013; ISA/EP.

Primary Examiner — Monica Huson
(74) Attorney, Agent, or Firm — Eric J. Sosenko; Jonathan P. O'Brien; Honigman Miller Schwartz and Cohn LLP

(57) ABSTRACT

A method for the fabrication of a container (802), comprising the steps of: —providing a preform (705), said preform being substantially tubular in form and being provided with a closed end (709), a cavity (707), and an open end (710) communicating with said cavity (707); —positioning at least one restriction device (711, 714) relative to the preform (705) so as to define at least one restriction zone and restrict expansion of the preform (705) therein; —injecting a predetermined volume of an incompressible fluid (800) into the cavity (707) of the preform (705) via the open end (710), provoking the preform (705) to plastically deform by expansion, said preform (705) expanding freely in at least one expansion zone outside said at least one restriction zone; and —Using for the fabrication of a beverage container (802).

15 Claims, 5 Drawing Sheets

STEP 3

(51) Int. Cl.
*B65D 1/00* (2006.01)
*B29C 49/06* (2006.01)
*B29C 49/24* (2006.01)
*B29C 49/46* (2006.01)
*B29C 49/48* (2006.01)
*B29C 49/64* (2006.01)
*B29L 31/00* (2006.01)

(52) U.S. Cl.
CPC .............. *B29C 49/24* (2013.01); *B29C 49/46* (2013.01); *B29C 49/48* (2013.01); *B29C 49/6436* (2013.01); *B65D 1/00* (2013.01); *B29C 2049/2422* (2013.01); *B29C 2049/465* (2013.01); *B29C 2049/4664* (2013.01); *B29L 2031/744* (2013.01); *Y10T 428/13* (2015.01)

(56) References Cited

U.S. PATENT DOCUMENTS

| | | | |
|---|---|---|---|
| 7,981,356 B2 * | 7/2011 | Warner | ................... B29C 49/46 264/523 |
| 2006/0261027 A1 * | 11/2006 | Denis | ................. B29C 49/0042 215/27 |
| 2011/0031659 A1 | 2/2011 | Warner et al. | |

* cited by examiner

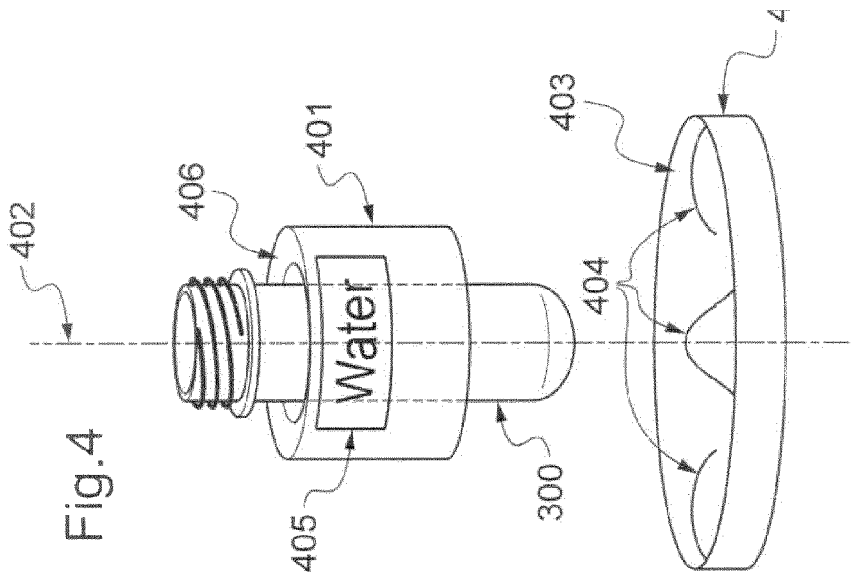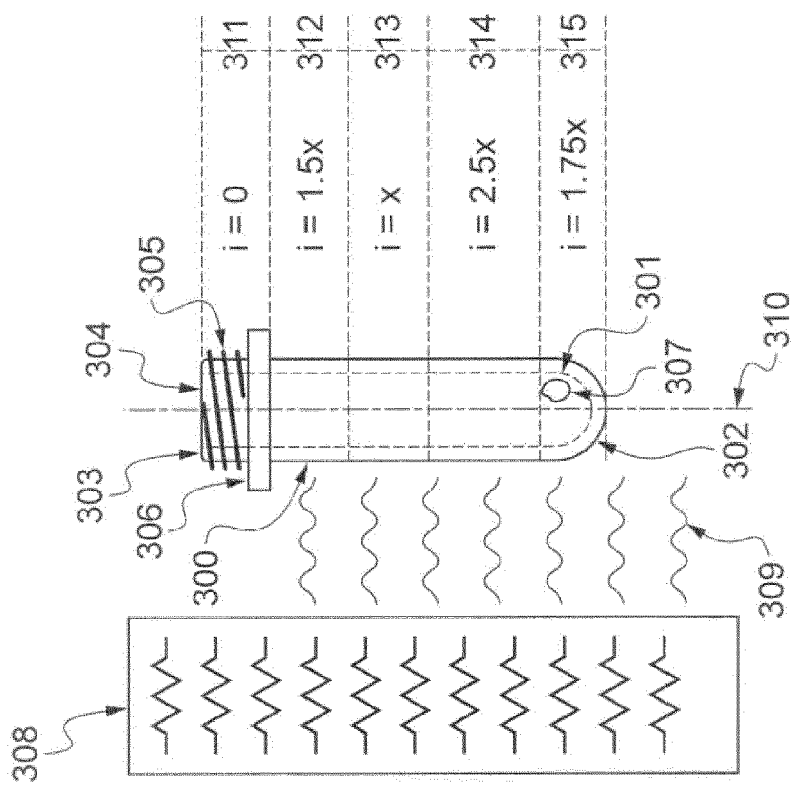

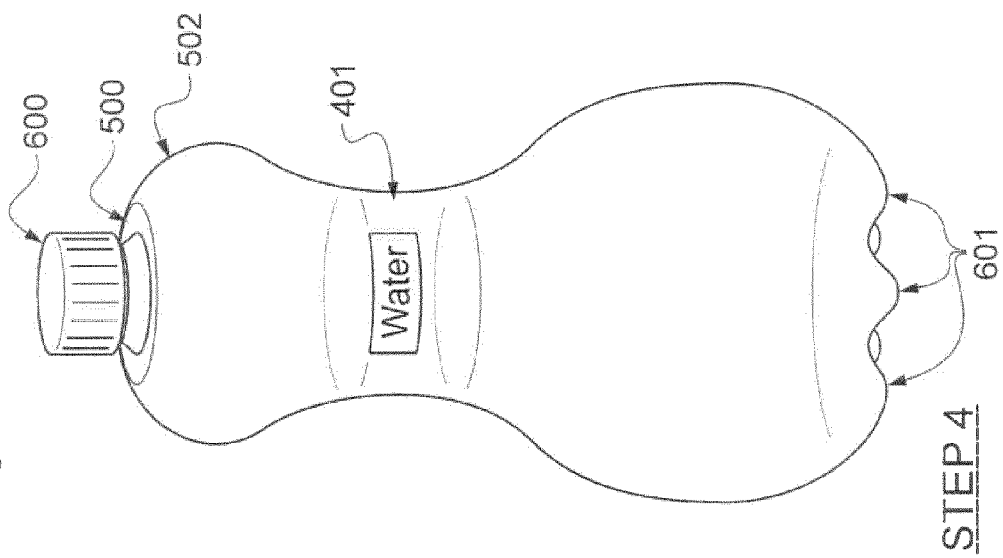
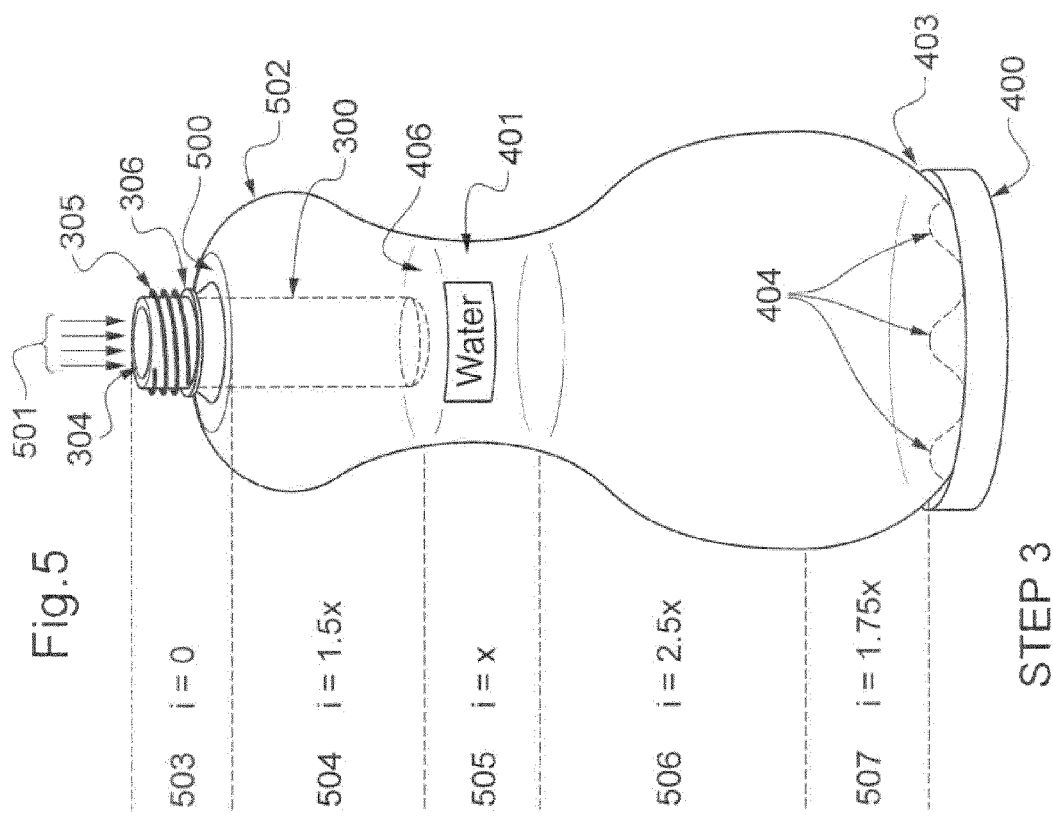

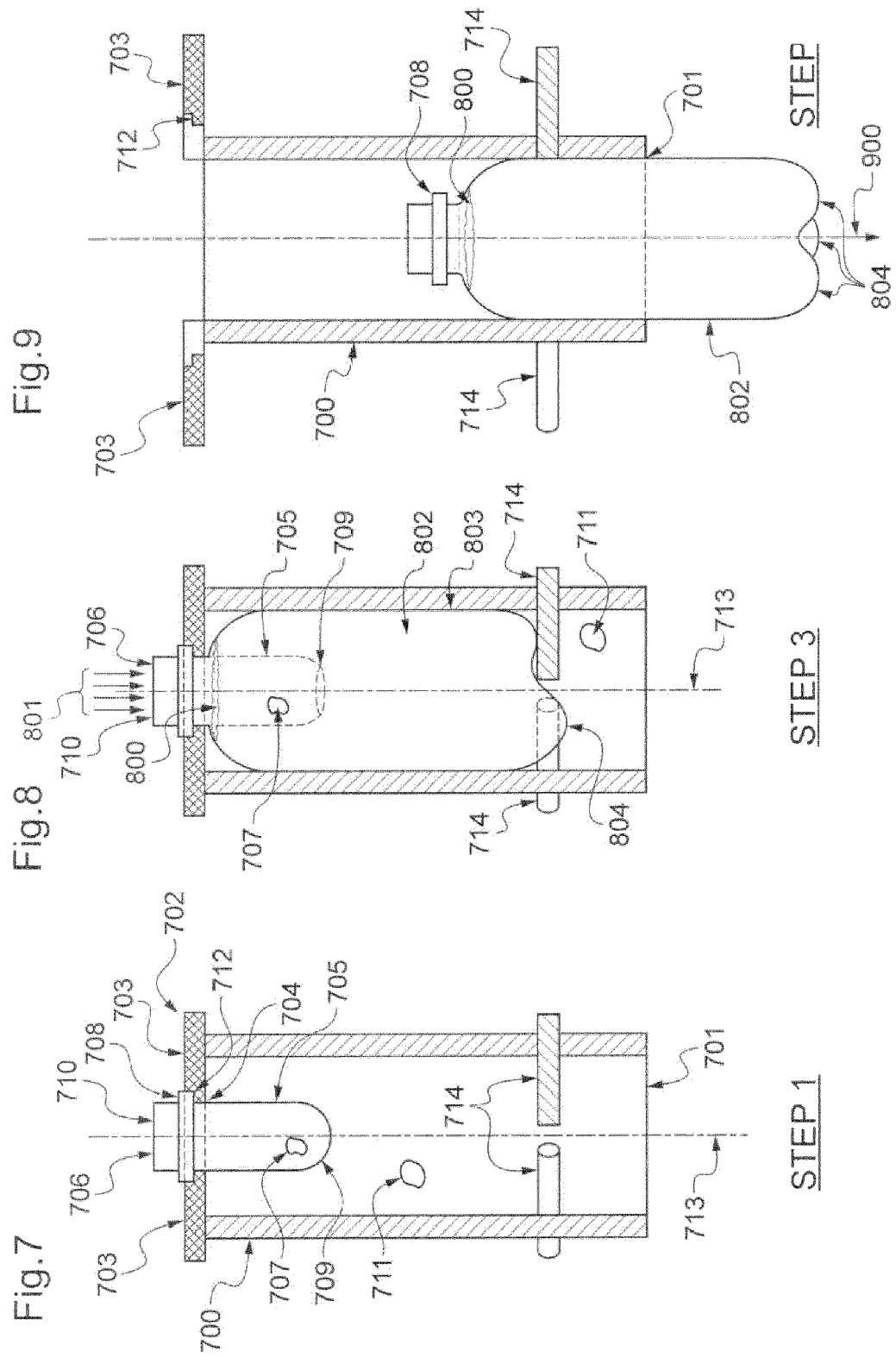

METHOD AND APPARATUS FOR THE FABRICATION OF A CONTAINER, SUCH AS A BEVERAGE CONTAINER

CROSS REFERENCE TO RELATED APPLICATIONS

This application is a U.S. National Phase Application under 35 U.S.C. 371 of International Application No. PCT/EP2013/062331 filed on Jun. 14, 2013. This application is based on and claims the benefit of priority from European Patent Application No. 12173754.8 filed Jun. 27, 2012. The entire disclosures of all of the above applications are incorporated herein by reference.

FIELD OF THE INVENTION

The invention relates to a method for the fabrication of a container. More specifically, it relates to the production of beverage containers for the storage of beverages by the method of blow molding, where such blow molding is accomplished by the injection of an incompressible fluid. It also relates to an apparatus for performing such a method to create a container as described above, as well as a beverage container produced by said method.

BACKGROUND

The conventional stretch blow molding process starts with the fabrication of an object called a "preform." The preform is of an elongated shape reminiscent of a test tube, having a substantially cylindrical body with an internal cavity defined by one closed end and one open end which communicates with the cavity. The open end of the preform may also be provided with external threading, a shoulder or rim, or other such features generally acting in concert with a sealing or closure means.

Most commonly, the preform will be fabricated by injection molding, using equipment and techniques known to the art of plastics molding. The fabrication of the open end of the preform is generally configured so as to be fundamentally completed in the injection molding step, so that the open end of the preform is in essentially the same configuration as the mouth of the finished container.

Once the preform is fabricated, it must be pre-heated. The pre-heating process is accomplished generally by the use of ovens, radiant heaters, hot-air jets, or other such methods. Preferably, the portion of the preform near the open end is not heated, so as to maintain the shape and structural integrity of the threads et al. which have been disposed at said open end. The preform is heated until it reaches the glass transition temperature for the particular kind of plastic from which it is fabricated, at which point it softens and becomes mechanically workable.

At this point, the preform is ready for molding. The preform is substantially enclosed within a mold, which is generally composed of three segments (a bottom and two sides) which are locked together very tightly. The mold assembly is generally provided with an opening such that the tubular portion of the preform is disposed so as to be within the mold, while the open end of the preform (i.e. the mouth portion) is disposed without. The mouth portion is not deformed or otherwise altered while the rest of the preform is deformed during subsequent steps in the process. The inside of the mold is configured so as to be a reverse image of the container from which the preform is ultimately to be produced.

Once the mold is closed about the preform, the inflation step is commenced. Air is employed as the working fluid, and is injected under very high pressure into the preform through its open end, causing the softened preform to expand until it conforms to the surface defined by the inside face of the mold. The air may be heated to facilitate the deformation of the preform. Once the preform has been fully inflated to the form defined by the mold cavity, the pressurized air within is released; the container is now finished. The mold segments are withdrawn from about the container and the container is removed from the machine. At this point, the machine is reset to begin the forming cycle anew with another preform. The container just produced will then generally proceed to be washed, filled, sealed, and packaged for distribution.

The prior art process is disadvantageous in several respects. Most importantly, it requires a very large amount of energy to carry out. As air is used as the working fluid, to properly carry out the inflation step it must be supplied at extremely high pressure to compensate for its compressibility. In many operations, this means that the air must be compressed to a minimum pressure of approximately 25 bars, requiring a large amount of energy and generating a great deal of waste heat. Usually, much of this heat dissipates into the surroundings. In sum, this means that a continuous source of a large amount of energy is required to successfully blow-mold plastic containers according to the technique known in the prior art.

The prior art process is also disadvantageous in that the production volumes that may be realized are limited by the structure of the molding apparatuses that must be employed. The process of the prior art employs a mold which is comprised of several segments. These segments are most commonly machined from solid blocks of aluminum, and as such often quite ponderous and unwieldy.

When the mold segments are brought together around the preform, they must be clamped together forcefully, then released when the inflation step is complete and moved out of the way so that the container may be removed and the molding process repeated. This slows down the operation of a blow molding machine and increases the time for one molding cycle to be completed (a.k.a. "cycle time"), reducing the overall output of each blow molding machine so employed.

Furthermore, the process is disadvantageous in that it requires a complete mold of the external surface of the container. Such molds must generally be machined from solid blocks of metal, as mentioned above, to achieve the required degree of physical robustness for use in a blow-molding operation. Being molds, they must also by definition include every surface feature of the finished container, and be machined to a very high degree of surface finish to avoid any defects in the mold from being transferred to the surface of the containers it produces. The mold segments must also fit together extremely closely, so as to avoid any leakage (a.k.a. "flashing") of the plastic between the mold segments or loss of pressure during the expansion step. The high pressures, tight tolerances; and large production runs involved in a blow-molding operation can quickly wear a mold assembly to the point that it is no longer usable for forming containers, requiring refinishing or replacement.

Thus, a properly-constructed mold requires several large blocks of solid metal, into which the exact form of the finished container must be machined within extremely tight tolerances and with a very high quality of finish. This is disadvantageous in that machining objects to such fine tolerances usually requires a considerable amount of time and expertise on the part of the machinist, which increases the cost of implementing this method of fabrication.

There have been attempts in the prior art address each of these problems. Most notably, US application 2006/0097417 described a method for the fabrication of containers, in which a plastic preform was inflated by the use of a fluid, either liquid or gas, under high pressure. The preforms were permitted to expand freely, producing containers having a teardrop shape.

This process is disadvantageous, in that the only control over the deformation of the preform or the form of the container so produced is achieved by the uneven pre-heating of the preform. While some control can be exercised over the broad form of the containers, the containers produced by this method are all still essentially of the same teardrop shape. Any forming of the container beyond this required an additional step where a tool was pressed into the container to deform it, performed subsequent to the inflation step and prior to the filling step.

It is accordingly an object of the invention to provide a process for the fabrication of a container which does not require large amounts of energy, cumbersome and expensive mold tooling, or time-consuming additional steps to produce a useable container.

According to a first aspect, the invention is directed to a method for the fabrication of a container, comprising the steps of providing a preform, said preform being substantially tubular in form and being provided with a closed end, a cavity, and an open end communicating with said cavity; positioning at least one restriction device relative to the preform so as to constrain expansion in at least one restriction zone; and injecting an incompressible fluid of a pre-determined volume into the cavity of the preform via the open end, provoking the preform to plastically deform by expansion, said preform expanding freely in at least one expansion zone outside said at least one restriction zone.

This method is advantageous as compared to the methods of the prior art, as it requires much less energy to carry out than the known methods. First, in any blow-molding process, the working fluid (whether compressible or incompressible) must be brought up to a sufficient pressure to effect the expansion of the preform. In the prior art, the working fluid is a gas, usually air. Compressing air to a sufficient pressure to mold a preform requires a large amount of energy and also generates a great deal of waste heat. In the present invention, the working fluid is an incompressible fluid, which requires much less energy to bring up to the required pressure than a compressible fluid. This may be accomplished by the use of pumps, which are well-known in the art, readily available, and easily adapted to high-volume, continuous service.

Furthermore, this invention is advantageous in that it does not require the implementation of a full multi-segment mold assembly, as in the prior art, to define the ultimate form of the containers it produces. Instead, the final form of the containers is defined by the volume of incompressible fluid injected into the preform to expand the preform, and the localized limitation of the preform's expansion by at least one restriction device.

During the injecting step, the preform will expand as fluid is injected into its cavity via the open end. The restriction zones serve to locally constrain this expansion: the preform will expand uniformly until its outer surface meets the restriction device. At this point, the outer surface of the preform will conform to the restriction zone as defined by the restriction device, and the expansion of the preform into the expansion zones will increase to compensate. By strategically positioning at least one restriction device, the preform may be expanded into a completed beverage container without fabricate and employ a full mold assembly.

The absence of a full multi-segment mold assembly, and the steps for closing it about a preform and opening it to remove the finished container, thus makes the method of this invention faster and more economical to practice than the method known to the prior art.

Also, the absence of a full mold assembly reduces the cost of manufacturing and maintaining the proper tooling required to carry out the process. Rather than manufacturing the mold segments from solid blocks of metal, it is only necessary to fabricate a restriction device or devices. These restriction devices may be configured so as to be much smaller than a full multi-segment mold assembly, possibly fabricated from plates rather than blocks, or from less-expensive materials. Such restriction devices are faster, cheaper, and easier to fabricate, and therefore less costly to fabricate and replace.

According to another feature, after the step for providing the preform, the method includes a step for stretching said preform along a longitudinal axis of said preform.

This facilitates the longitudinal deformation of the preform during the injecting step, promoting uniform deformation of the preform and, as a result, realizing consistent wall thickness and physical properties along the surface of the resultant beverage container. In this way, a greater variety of containers may be produced, while still maintaining consistent structural integrity and uniformity of said containers.

According to still another feature, said pre-determined volume of incompressible fluid injected into the preform during the injecting step is sealed into the container.

This is advantageous in that, if the working fluid used to expand the container is also the fluid which the container is meant to eventually contain, it permits the container to be fabricated and filled at the same time. Combining the steps of expansion and filling thus serve to shorten the process for packaging a liquid product and reduces the amount of equipment needed to carry out the process, thereby lowering the costs incurred by the operator.

According to still another feature, at least one restriction device is a label.

This is advantageous in that it permits the steps of forming the container and labeling it to be combined. This reduces the number of steps required to produce a formed and filled container, yielding faster and more economical output from a production line embodying the invention as compared to one according to the prior art.

According to still another feature of the invention, the invention is further characterized in that prior to the step for injecting a pre-determined volume of an incompressible fluid, the method includes an additional step for pre-heating at least a portion of the preform.

This is advantageous in that when the preform is sufficiently pre-heated, it will become more readily disposed to plastic deformation. This permits the preform to deform to a greater degree during the injecting step than would be possible without such pre-heating. In this way, a greater variety of beverage containers may be manufactured with the process of the present invention than otherwise, thereby increasing the flexibility of the present invention.

According to still another feature, the preform is divided into a plurality of regions, the pre-heating of each region being independently controlled.

This is advantageous in that it permits the preform to be pre-heated to a greater or lesser degree according to the degree of deformation desired in any one particular area. In this way, the amount of total energy used to pre-heat the preform may be minimized, as the pre-heating is only performed where it is necessary, and only to the degree required to meet the requirements of the particular application at hand. In this way, the flexibility that is realized with the addition of a pre-heating step may be realized in a way which is as energy-efficient and cost-effective as possible.

According to a second aspect, the invention is directed to an apparatus for the fabrication of a container, comprising a means for injecting an incompressible fluid of a pre-determined volume into a cavity of a preform via an open end, said preform being substantially tubular in form and provided with a closed end, said open end communicating with said cavity; and at least one restriction device, said at least one restriction device defining at least one restriction zone; wherein said at least one restriction device is disposed relative to the preform so that upon injection of said incompressible fluid of a predetermined volume into the cavity of the preform, the expansion of the preform is constrained within the at least one restriction zone and free within at least one expansion zone outside said at least one restriction zone.

Using at least one restriction device, rather than a full multi-segment mold, reduces the time required to mold a container in that it reduces the time required to prepare the machine to form the preform.

In addition, energy consumption is reduced, as the use of an incompressible fluid to form the container requires less energy to bring to proper working pressure than air or other compressible fluids. In this way, considerable energy savings are realized while at the same time improving output and lowering total cost per unit produced, relative to apparatuses known to the prior art.

According to an advantageous feature, the apparatus comprises means for stretching the preform along a longitudinal axis of said preform.

Absent the use of a stretching means, the natural tendency of the deforming preform is to expand outward at the same rate in all directions. This means that for containers which are longer than they are wide, the expansion of the preform may not be appropriate at every location on the preform's surface, resulting in containers with uneven wall thickness The usage of a stretching means promotes the even deformation of the preform into a tall container, with even wall thickness and, by extension, consistent physical properties across its surface. In this way, the apparatus may be used to fabricate a wider range of containers, thereby increasing the apparatus' flexibility in operation.

According to another feature, at least one restriction device is disposed coaxially to a longitudinal axis of said preform so as to restrict the expansion of said preform in a radial direction.

This is advantageous in that a restriction device so configured will constrain the radial expansion of the preform, and thus the radius of the containers formed therefrom, over the portion of its surface that defines a restriction zone. In this way, then, the radius of a finished container may be defined at one or several regions while the rest of the preform freely expands. One may thereby fabricate a greater variety of containers, and with greater control over their dimensions and attributes.

According to another feature, at least one restriction device is a label.

This is advantageous in that an apparatus so configured will produce containers which are fabricated, and labeled in one step. This increases the speed and output of a bottling operation, as the time to transfer a container between a fabrication step and a labeling step is eliminated. The fabrication process is thereby rendered faster, more efficient and more cost-effective.

According to still another feature of the invention, said at least one restriction device comprises a tube, disposed about the preform so as to be coaxial with said preform's longitudinal axis and restrict the expansion of said preform in the radial direction.

This is advantageous in that it produces elongated containers with a substantially circular cross-section, a form which is desirable for a beverage container. Such a tube may, in some embodiments, be fabricated from ordinary pipe. This permits the apparatus to be employed without the expense of fabricating a full multi-segment mold. Thus, the output of the apparatus embodying the invention is further increased while being rendered more economical.

According to still another feature, at least one restriction device is disposed perpendicularly to a longitudinal axis of said preform, thereby restricting the expansion of said preform in the longitudinal direction.

This is advantageous in that a restriction device so configured will constrain the longitudinal expansion of the preform, and thus the length of the containers formed therefrom, over the portion of its surface that defines a restriction zone. In this way, then, the length of the finished container may be defined at one or several regions, while the rest of the preform is permitted to expand freely. In this way, then, the restriction devices may be configured so as to yield a finished container with the required dimensional attributes while still expanding freely elsewhere. One may thereby fabricate a greater variety of containers, and with greater control over their dimensions and attributes.

According to another feature, said at least one restriction device comprises a base plate disposed so as to define a bottom end of the container.

This is advantageous in that, depending on its size and intended application, it may be desirable for the container to have a specific, defined shape at its base. Utilizing a restriction device in the form of a base plate will produce a container whose form is otherwise defined by the volume of incompressible fluid injected into the preform, but whose base portion is as defined by the base plate. This renders the method more flexible, permitting its advantages to be realized in a greater number of applications.

According to still another feature, the apparatus comprises a plurality of base pins, said base pins being retractably disposed and arranged perpendicularly to said longitudinal axis.

This is advantageous in that the preform expands around the base pins, forming a plurality of petaloid lobes in the bottom of the beverage container so formed. The pins are retractably mounted so that the container may be removed after forming is complete. Such petaloid shapes are employed on the bottoms of containers holding carbonated liquids or other such substances under pressure, as they are highly resistant to pressure and give the container a good degree of structural rigidity and strength. Through this feature of the invention, a container having a petaloid base may be formed without the use of a full multi-segment mold, and without the accompanying expense of its fabrication. In this way, the advantages of a petaloid base may be realized with a minimum of cost and adaptation, and with the increased efficiency and rate of production that the other features and aspects of the present invention entail.

According to still another feature, at least one restriction device is disposed obliquely to a longitudinal axis of said preform.

This is advantageous in that it permits the fabrication of containers where one region of its surface is oblique to the open end, said region being substantially defined by the restriction device. In this way, the invention is rendered more flexible and capable of producing containers in a greater variety of forms.

According to a third aspect, the present invention concerns a beverage container fabricated by a method as described above.

This is advantageous in that such a beverage container embodies the advantages of the method by which it is fabricated. The beverage container will thus be better adapted to its intended use and less expensive than comparable beverage containers produced by methods known in the prior art.

BRIEF DESCRIPTION OF THE DRAWINGS

Other particularities and advantages of the invention will also emerge from the following description.

In the accompanying drawings, given by way of non-limiting example:

FIG. 3 is an orthogonal view of an apparatus for the fabrication of a second beverage container, during a first step for pre-heating a preform;

FIG. 4 is an axonometric view of an apparatus for the fabrication of a second beverage container, during a second step for positioning a preform;

FIG. 5 is an axonometric view of an apparatus for the fabrication of a second beverage container, during a third step for injecting an incompressible fluid;

FIG. 6 is an axonometric view of a second beverage container;

FIG. 7 is a partial cross-section view of an apparatus for the fabrication of a third beverage container, configured for a first step for positioning a preform;

FIG. 8 is a partial cross-section view of an apparatus for the fabrication of a third beverage container during a second step for injecting an incompressible fluid; and FIG. 9 is a partial cross-section view of an apparatus for the fabrication of a third beverage container during a third step for ejecting the third beverage container.

DESCRIPTION OF EMBODIMENTS

Figure 1:
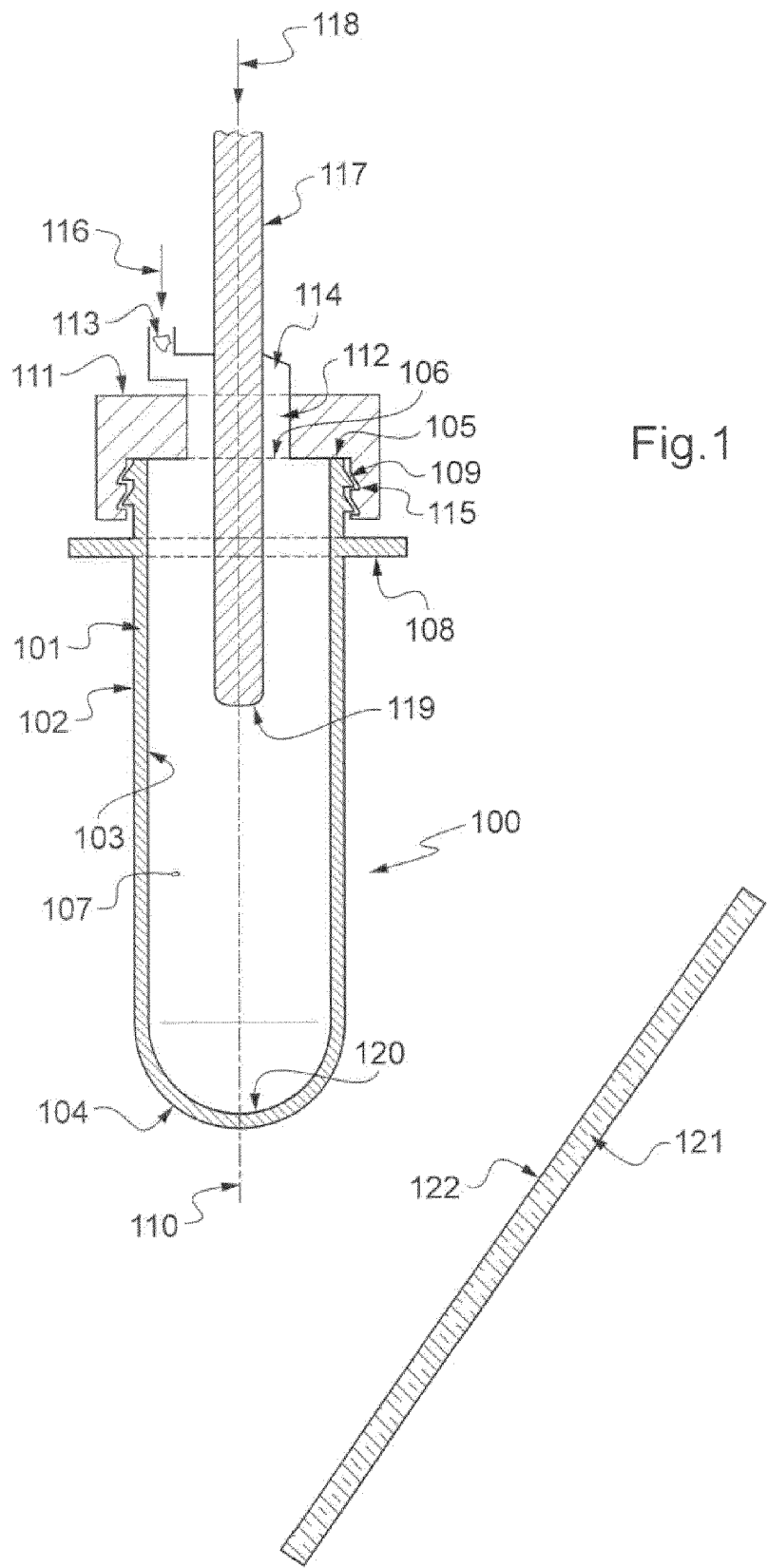
FIG. 1 is a cross-sectional view of an apparatus for the fabrication of a first beverage container, including a preform and a restriction device, prior to an injecting step.
Figure 2:
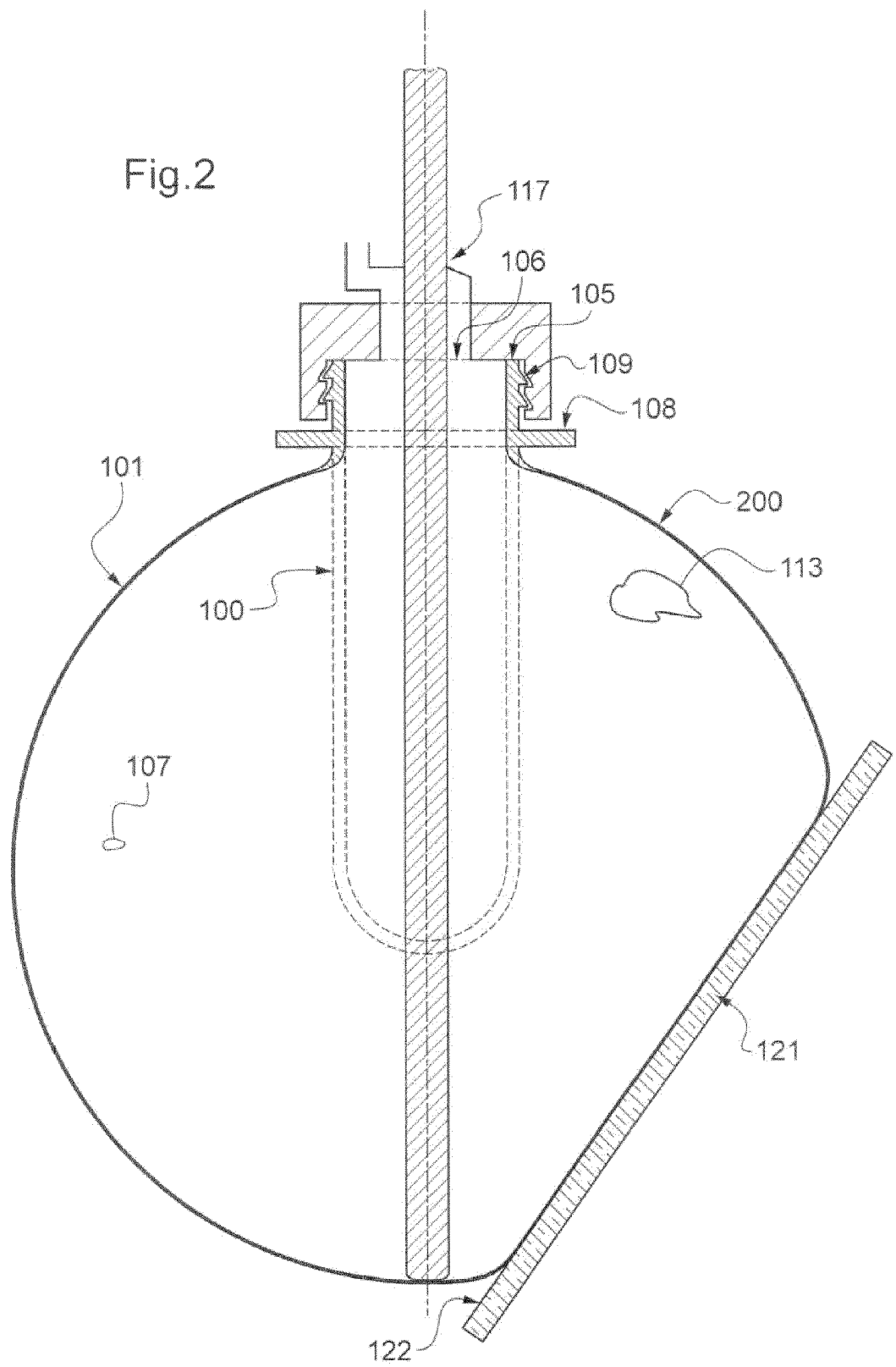
FIG. 2 is an orthogonal cross-section view of an apparatus for the fabrication of a first beverage container after an injecting step.

First, a method and apparatus for the fabrication of a first beverage container will be depicted with reference to FIGS. 1 and 2.

FIG. 1 depicts the apparatus prior to an injecting step, wherein the first preform 100 is deformed by expansion. The first preform 100 is substantially tubular in form, having a wall 101 with an outer surface 102 and an inner surface 103, and configured so as to be closed at a first end 104 and open at a second end 105. The second end 105 is provided with a mouth 106, which communicates with the cavity 107 in the first preform 100 defined by said wall 101 and first end 104. The second end 105 is also provided with a flange 108 and first threads 109. Ideally, the first preform 100 is fabricated so as to be symmetric about the longitudinal axis 110.

In one embodiment, the first preform 100 is fabricated from polyethylene terephthalate (PET), a thermoplastic polymer commonly employed in the fabrication of beverage containers which is strong, durable, inexpensive, and easily-fabricated. It is also a material whose properties are well-understood and predictable in a manufacturing context. However, other varieties of polymers may be employed, depending on the beverage container that is to be formed and the application in which it is to be used.

PET is particularly advantageous in that it may achieve a high degree of crystallization, both in an absolute sense and relative to other thermoplastic polymers that may be employed for the fabrication of beverage containers. This crystallization improves the strength and resilience of the object in which it is found.

Furthermore, when such an object is below the glass-transition temperature (approximately 80° C.) of PET, deformation of that object will induce partial crystallization in the PET. This process generates heat within the object, which will further facilitate its deformation. A preform fabricated from PET, such as the first preform 100, is thus ideally suited for this method.

The apparatus itself comprises a head 111, which is provided with a fluid port 112. A pre-determined volume of incompressible fluid 113 is injected through the fluid port 112 and into the cavity 107 by way of the channel 114. The head 111 is provided with second threads 115, which engage the first threads 109 at the second end 105 of the first preform 100, maintaining the fluid port 112 in sealed, pressure-tight communication with the cavity 107. While this embodiment employs a threaded connection, other embodiments may employ different means to maintain pressure-tight communication At the same time as the pre-determined volume of incompressible fluid 113 is injected at pressure 116, the stretch rod 117 is advanced into the cavity 107 in direction 118, until the tip 119 contacts the contact point 120, which is located on the inner surface 103 of the first preform 100 at the first end 104. At this point, the first preform 100 will begin to deform, the wall 101 decreasing in thickness as the first preform 100 expands.

While this apparatus employs a rod which is inserted into the cavity 107 of the first preform 100, other means for stretching a preform may be employed in other embodiments of the invention. Such means may include, but are not limited to, grippers and suction devices. The means for stretching the preform may be selected to achieve optimal results for the particular application in which they are to be employed.

The apparatus is also provided with a restriction device 121. The restriction device 121 is disposed so that the expanding first preform 100 will make contact with the face 122 of the restriction device 121. The restriction device 121 resists the expansion of the first preform 100 and thereby constrains it along the face 122. The face 122 thus defines a restriction zone.

In this embodiment, a restriction device 121 in the form of a plate is employed, but other, more complex forms may be used as the application requires. Such aspects as shape, size, surface pattern, and others may be altered to better suit the particular application in which they are employed.

FIG. 2 depicts the apparatus after the injecting step. The first preform 100 (whose outline is depicted here for reference) has been fully expanded into a first beverage container 200. The stretch rod 117 has been extended to the full length of the first beverage container 200.

The first beverage container 200 is essentially unchanged from the first preform 100 near the second end 105, such that the mouth 106, flange 108, and first threads 109 are substantially the same form as they were on the first preform 100. The mouth 106, flange 108, and first threads 109 are thus maintained in optimal condition for the application of a screw-on cap or similar closure.

The rest of the first preform 100, however, has expanded, such that the wall 101 has become thinner and the cavity 107 is filled with the pre-determined volume of incompressible fluid 113 that had been injected. Except for the features near the second end 105 as described above, the first preform 100 has deformed freely over its surface during the injection step, varying according to the pre-determined volume of incompressible fluid 113 injected therein. The volume of the first beverage container 200 is therefore defined generally by the pre-determined volume of the incompressible fluid 113 used to form it.

In the region of the restriction device 121, however, the wall 101 of the first beverage container 200 is restricted in its expansion such that the face 122 defines a restriction zone. The restriction zone is located substantially where the wall 101 of the beverage container 200 contacts the face 122 of the restriction device 121.

The form of the first beverage container 200 is therefore defined by two elements: the constraint posed upon the expansion of the first preform 100 by the restriction zone defined by the face 122, and the free expansion of the first preform 100 elsewhere during the injection of the pre-determined volume of incompressible fluid 113.

Second, a method for the fabrication of a second beverage container will be depicted, with reference to FIGS. 3 through 6. FIGS. 3 through 6 depict a method for the fabrication of a second beverage container, by the pre-heating of a second preform, the positioning of said second preform in relation to at least one restriction device, and the expansion of said preform into a beverage container.

FIG. 3 depicts a first step of this method, a step for pre-heating a second preform. A second preform 300 is provided, said second preform 300 being fabricated from a thermoplastic polymer and comprising a wall 301, a closed first end 302; an open second end 303 which is provided with a mouth 304, threads 305, and a flange 306; and enclosing the cavity 307.

In a first step, the second preform 300 is placed in proximity to a heating device, such as a radiant heater 308 as depicted here. The radiant heater 308 projects infrared waves 309 at the second preform 300, which raise the temperature of the wall 301. Preferably, the second preform 300 is rotated about its longitudinal axis 310, to ensure even pre-heating of the entire wall 301 of the second preform 300. This pre-heating will cause the second preform 300 to soften, becoming malleable and more susceptible to deformation.

The wall 301 of the second preform 300 is further divided into a plurality of regions 311 through 315. Five regions are depicted in this embodiment; other embodiments may employ more or fewer regions depending on the form of the beverage container to be fabricated. The radiant heater 308 is configured so that its output may be varied along its length, thereby varying the intensity of heating (here denoted by the symbol i) in each region 311-315. The greater the intensity of heating in any one region 311-315, the softer the wall 301 of the second preform 300 will be in that region 311-315, and the greater the deformation in that region 311-315.

The intensity i for each region 311-315 may be described as a multiple of the average intensity x. The average intensity x is, in turn, adapted to the size of the preform 300 and the thickness of its wall 301, the material from which it is fabricated, and the degree to which the preform 300 will be expanded in a later step. In this embodiment, for example, the intensity i of the infrared waves 308 incident on the wall 301 of the preform in the region 313 is equal to the average intensity x, while the intensity i in region 314 is two and a half times the average intensity x, and there is no heating at all in region 311. The wall 301 of the preform 300 is therefore rendered more susceptible to deformation in some regions than others.

FIG. 4 depicts a second step of this method, a step for positioning a pre-heated second preform prior to an injecting step.

The second preform 300 is positioned in relation to a base plate 400 and a label 401. The positioning of the base plate 400 and label 401, and the positioning and forming of the second preform 300, may be accomplished by automated means, which may be adapted from techniques known in the art of constructing assembly lines. In this figure, however, such means are omitted for clarity.

Preferably, the second preform 300, base plate 400, and label 401 are all symmetric about and coaxial with the axis 402. This will result in the production of a beverage container which is also axially symmetric, facilitating later processing, transportation, and storage.

The base plate 400 is positioned below the second preform 300. In this embodiment, the base plate 400 is provided with a concavity 403 and a plurality of ridges 404; ideally, the concavity 403 and the ridges 404 of the base plate 400 are configured so as to define the bottom of a beverage container.

The label 401 is ideally a ring of plastic which is pre-printed with the product logo 405 and other such information. The label 401 is positioned coaxially about the second preform 300, with the inside surface 406 facing the preform 300. Ideally, the label 401 will remain attached to the resultant beverage container after a subsequent injection step.

FIG. 5 depicts a third step of this method, a step for injecting an incompressible fluid, where the pre-heated, positioned second preform is expanded into a second beverage container.

A pre-determined volume of incompressible fluid 500 is injected at pressure 501 into the second preform 300 (whose outline is depicted here for reference) via the mouth 304. The apparatus for injecting the incompressible fluid 500 into the second preform 300 is omitted for clarity.

The injection of the incompressible fluid 500 at pressure 501 into the second preform 300 causes said second preform 300 to plastically deform by expansion. This deformation is facilitated by the pre-heating step depicted in FIG. 3 and discussed above, which has rendered the second preform 300 soft and malleable. The injection of the incompressible fluid 500 causes the second preform to expand into a second beverage container 502.

The expansion of the second preform 300 into the second beverage container 502 is governed in part by the pre-heating applied to the second preform 300, as described above and as depicted in FIG. 3. The first beverage container 502 is divided into a plurality of portions, each corresponding to a region of the preform: a neck portion 503, corresponding to the region 311; an upper portion 504, corresponding to the region 312; a middle portion 505, corresponding to the region 313; a lower portion 506, corresponding to the region 314; and a base portion 507, corresponding to the region 315. The degree of expansion, and thus the form that the first beverage container takes in each of the portions 503-507 is a consequence of the intensity of pre-heating in each of the regions 311-315 of the preform 300.

In this embodiment, the expansion in the upper portion 504 and lower portion 506 is of a greater degree than that of the middle portion 505. This is due in part to the fact that the label 401 acts as a restriction device, with its interior surface 406 thus defining a restriction zone. The expansion of the second preform 300 is thus constrained within the label 401 but free outside of it.

The result of this is that the diameters of the upper portion 504 and lower portion 506 are greater than that of the middle portion 505. The resulting second beverage container 502 is thus given an aesthetically-pleasing and ergonomic "hourglass" shape. The hourglass shape of the second beverage container 502 also serves to keep the label 401 in position without the need for adhesive or other fixative means, improving the economy of the beverage containers' fabrication.

The base plate 400 also serves as a restriction device, restricting the expansion of the second preform 300 in the downward direction. As the second preform 300 expands, it fills the concavity 403 of the base plate 400 and takes its form, including that of the ridges 404, thereby molding the base portion 507 of the resultant second beverage container 502. The concavity 403 thus also defines a restriction zone.

FIG. 6 depicts a finished second beverage container. A cap 600 is screwed onto the second beverage container 502, thereby sealing it and enclosing the pre-determined volume of incompressible fluid 500 into said second beverage container 502. The base of the beverage container is provided with a plurality of feet 601, said feet 601 mirroring the form of the base plate 400 as depicted in FIG. 4 and described above.

Third, a method and apparatus for the fabrication of a third beverage container will be depicted with reference to FIGS. 7-9.

FIG. 7 depicts an apparatus for the fabrication of a third beverage container, configured for a first step for positioning a third preform. The apparatus of FIG. 7 comprises a tube 700, which has a circular cross-section and is oriented vertically. The tube is open at a bottom end 701, while at a top end 702 the tube is provided with a pair of neck plates 703. The neck plates 703 are slideably disposed at the top end of the tube 700, and are configured such that when the two neck plates 703 are drawn together there is provided a preform hole 704.

The apparatus is configured to accommodate a third preform 705. As with the first preform 100 and the second preform 300 described above, the third preform 705 is substantially tubular in shape, having a mouth 706 which communicates with a cavity 707 inside said third preform 705, and a flange 708 near the mouth of said third preform 705. The preform 705 is thus provided with a closed first end 709 and an open second end 710.

The preform hole 704 is configured to permit the third preform 705 to sit with its flange 708 atop the neck plates 703 while most of the third preform 705 protrudes into the interior 711 of the tube 700. The neck plates 703 may optionally be provided with a counterbore 712 in which the flange 708 is seated. Ideally, the neck plates 703, the preform hole 704, and the counterbore 712 are configured so that the tube 700 and the third preform 705 are coaxial along the longitudinal axis 713. This will ensure a consistent positioning of the third preform 705 relative to the tube 700.

The tube 700 is further provided with a plurality of retractable pins 714, which protrude radially through the walls of the tube 700 into its interior 711. The retractable pins 714 serve as restriction devices during the expansion of the third preform 705 during an injection step. The interior 711 and retractable pins 714 thus define restriction zones along their surfaces.

The number of retractable pins 714 which are employed may be varied according to the particular application in which the beverage container so produced is to be employed; the embodiment of FIGS. 7-9 employs 3, of which two are visible.

FIG. 8 depicts the apparatus during a second step for injecting an incompressible fluid. An incompressible fluid 800 is injected with pressure 801 through the mouth into the third preform 705 (here depicted in dotted lines), thereby expanding it into a third beverage container 802. The third preform 705 expands radially until it contacts the inner surface 803 of the tube 700, where the radial expansion of the third preform 705 is restricted. The third beverage container 802 is thus approximately the same diameter as the inside of the tube 700.

The third preform 705 also expands freely along the longitudinal axis 713, past the retractable pins 714. The free expansion of the third preform 705 along the longitudinal axis 705 and past the retractable pins 714 results in a plurality of petaloid lobes 804. As they are formed by free expansion, the size of the petaloid lobes, and by extension the volume of the third beverage container as a whole, will thus be a function of the volume of incompressible fluid 800 that is used to form the third beverage container 802 during the injecting step.

Furthermore, the third beverage container 802 may stand upon said petaloid lobes 804. This will permit the third beverage container 802 to be stood upright without having to employ an additional structure such as a collar or tray, and without having to perform an additional step to integrate such additional structure with the third beverage container.

FIG. 9 depicts the apparatus during a third steps for ejecting the third beverage container. At this point, the third beverage container 802 has been fully formed, and the full volume of the incompressible fluid 800 has been injected therein. The third beverage container 802 may now be removed from the apparatus.

The neck plates 703 are retracted, disengaging the flange 708 from the counterbore 712. The retractable pins 714 are also retracted, withdrawing them from between the finished petaloid lobes 804 and permitting the finished third beverage container 802 to fall through the open bottom end 701 of the tube 700 in direction 900. The finished third beverage container 802 may then be transported elsewhere for further processing, e.g. capping or labeling.

While ideally the apparatus is configured so that the third beverage container 802 falls freely from the tube by the force of gravity, in some embodiments it may be necessary to provide a means for provoking the third beverage container 802 to fall from the tube 700 in direction 900.

This may be accomplished by depressurizing the incompressible fluid 800 within the third beverage container 802 slightly, so that the elasticity of the third beverage container 802 causes it to contract enough to permit it to fall freely from the tube 700. Other means for provoking the ejection of the third beverage container 802 may include, but are not limited to, mechanical pushers or grippers, or suction devices.

Of course, the invention is not limited to the embodiments described above and in the accompanying drawings. Modifications remain possible, particularly as to the construction of the various elements or by the substitution of technical equivalents, without thereby departing from the scope of protection of the invention.

In particular, it should be understood that while this disclosure is concerned with the fabrication of beverage containers, the methods and apparatuses in the foregoing disclosure are not necessarily limited to the fabrication of containers for beverages. Rather, it is possible to adapt the methods and apparatuses mentioned above for the fabrication of containers for many kinds of substances, including (but not limited to) cosmetics, medications, chemicals, and the like.

The exact configuration and operation of the invention as practiced may thus vary from the foregoing description without departing from the inventive principle described therein. Accordingly, the scope of this disclosure is intended to be exemplary rather than limiting, and the scope of this invention is defined by any claims that stem at least in part from the foregoing disclosure.

The invention claimed is:

1. A method for fabrication of a container, comprising the steps of:
    providing a preform, said preform being substantially tubular and being provided with a closed end a cavity, and an open end communicating with said cavity;
    positioning at least one restriction device relative to the preform so as to define at least one restriction zone and constrain expansion of the preform therein; and
    injecting a pre-determined volume of an incompressible fluid into the cavity of the preform via the open end, provoking the preform to plastically deform by expansion, said preform expanding freely in at least one expansion zone outside said at least one restriction zone whereby a resultant portion of the container corresponding to said expansion zone is formed without contacting any element restricting expansion thereof.

2. The method according to claim 1, wherein that after the step for providing the preform, the method includes a step for stretching said preform along a longitudinal axis of said preform.

3. The method according to claim 1, wherein the pre-determined volume of incompressible fluid injected into the preform during the injecting step is sealed into the container.

4. The method according to claim 1, wherein the at least one restriction device is a label.

5. The method according to claim 1, wherein prior to the step for injecting a pre-determined volume of an incompressible fluid, the method includes an additional step of pre-heating at least a portion of the preform.

6. The method according to claim 5, wherein the preform is divided into a plurality of regions, and each region of the preform is independently preheated.

7. An apparatus for the fabrication of a container, comprising:
    an injection head configured to inject an incompressible fluid of a predetermined volume into a cavity of a preform via an open end, said preform being substantially tubular in form and provided with a closed end, said open end communicating with said cavity;
    at least one restriction device, said at least one restriction device defining at least one restriction zone;
    an expansion zone outside of the at least one restriction zone; and
    wherein said at least one restriction device is disposed relative to the preform so that upon injection of said incompressible fluid of a predetermined volume into the cavity of the preform, the expansion of the preform is constrained within the at least one restriction zone and free within at least one expansion zone outside said at least one restriction zone whereby a resultant portion of the container corresponding to the expansion zone is formed without contacting any element restricting expansion thereof.

8. The apparatus of claim 7, further comprising a stretch member configured to stretch the preform along a longitudinal axis of said preform.

9. The apparatus of claim 7, wherein the at least one restriction device is disposed coaxially to a longitudinal axis of said preform so as to restrict the expansion of said preform in a radial direction.

10. The apparatus of claim 9, wherein said at least one restriction device is a label.

11. The apparatus of claim 9, wherein said at least one restriction device comprises a tube, disposed coaxially about a longitudinal axis of said preform.

12. The apparatus of claim 7, wherein the at least one restriction device is disposed longitudinally of said preform thereby restricting the expansion of said preform in a longitudinal direction.

13. The apparatus of claim 12, wherein the at least one restriction device comprises a base plate disposed so as to define a bottom end of the container.

14. The apparatus of claim 12, wherein the at least one restriction device comprises a plurality of base pins, said base pins being retractably-disposed and arranged perpendicularly to said longitudinal axis.

15. The apparatus of claim 7, wherein the at least one restriction device disposed obliquely to a longitudinal axis of said preform.

* * * * *